United States Patent
Soncina

(10) Patent No.: US 10,711,847 B2
(45) Date of Patent: Jul. 14, 2020

(54) CLUTCH GROUP FOR POWER TAKE-OFF

(71) Applicant: OMSI TRASMISSIONI S.p.A., Roè Volciano, Brescia (IT)

(72) Inventor: Renato Soncina, Brescia (IT)

(73) Assignee: OMSI TRANSMISSIONI S.p.A., Roe Volciano, Brescia (IT)

( * ) Notice: Subject to any disclaimer, the term of this patent is extended or adjusted under 35 U.S.C. 154(b) by 286 days.

(21) Appl. No.: 15/736,251

(22) PCT Filed: Jun. 13, 2016

(86) PCT No.: PCT/IB2016/053476
§ 371 (c)(1),
(2) Date: Dec. 13, 2017

(87) PCT Pub. No.: WO2017/013504
PCT Pub. Date: Jan. 26, 2017

(65) Prior Publication Data
US 2018/0180114 A1    Jun. 28, 2018

(30) Foreign Application Priority Data
Jul. 17, 2015   (IT) .......................... 102015000035444

(51) Int. Cl.
*F16D 25/0638*   (2006.01)
*B60K 17/28*   (2006.01)
*F16D 13/52*   (2006.01)

(52) U.S. Cl.
CPC .......... *F16D 25/0638* (2013.01); *B60K 17/28* (2013.01); *F16D 13/52* (2013.01)

(58) Field of Classification Search
CPC .. F16D 25/0638; F16D 13/52; F16D 2125/10; B60K 17/28
See application file for complete search history.

(56) References Cited

U.S. PATENT DOCUMENTS 5,826,460 A    10/1998   Soncina et al.
6,393,944 B1   5/2002    Soncina et al.
(Continued)

FOREIGN PATENT DOCUMENTS

DE   28 28 468 A1   2/1979
EP   1 245 426 A2   10/2002
(Continued)

OTHER PUBLICATIONS

International Search Report and Written Opinion of the International Searching Authority for corresponding International Patent Application No. PCT/IB2016/053476 dated Aug. 4, 2016, 10 pages.

*Primary Examiner* — Huan Le
(74) *Attorney, Agent, or Firm* — Merchant & Gould P.C.

(57) ABSTRACT

A clutch group (1) is for power take-offs for industrial vehicles. The clutch group (1) includes a clutch shaft (10) and an input gear (20) operatively connected to the clutch shaft (10), by clutch discs (30) suitable to engage each other through friction. The clutch group (1) has a bell (40) supported by the clutch shaft (10) around it and suitable to house the clutch discs (30) and a pneumatic controller (50) operable by pressurized fluid to control the mutual commitment between the clutch discs (30). The pneumatic controller (50) includes a main piston (51) housed in a main thrust chamber (510) and an auxiliary piston (52) housed in an auxiliary thrust chamber (520).

15 Claims, 8 Drawing Sheets

(56) References Cited

U.S. PATENT DOCUMENTS

2009/0288927 A1* 11/2009 Dougan ............. F16D 25/0638
 192/52.1
2013/0228411 A1 9/2013 Wesley et al.
2015/0345570 A1* 12/2015 Tsukuda ................ F16H 63/065
 192/3.63

FOREIGN PATENT DOCUMENTS

IT   1 277 770 B   11/1997
IT   1 314 722 B1  1/2003

* cited by examiner

CLUTCH GROUP FOR POWER TAKE-OFF

This application is a National Stage Application of PCT/IB2016/053476, filed 13 Jun. 2016, which claims benefit of Serial No. 10/2015000035444, filed 17 Jul. 2015, and which applications are incorporated herein by reference. To the extent appropriate, a claim of priority is made to each of the above disclosed applications.

BACKGROUND OF THE INVENTION

The present invention relates to a clutch group, a flywheel power take-off, an intermediate power take-off and a gearbox power take-off comprising said clutch group.

In other words the clutch group according to the present invention is suitable to be applied to industrial vehicle power take-offs. In this description, "industrial vehicle" means a vehicle such as a truck, articulated vehicle, a road tractor or a farm machine.

Power take-off solutions in industrial vehicles have long been known.

For example, the patents on behalf of the Applicant IT1277770 and IT1314722 show some power take-off solutions suitable to be interposed between the engine group and/or gearbox speed change unit and rear axle, in which the command of the actuation of the outputs for withdrawing power is obtained by clutch groups.

In addition, flywheel power take-off solutions are known, i.e. mounted between the engine group and the gearbox speed change unit, in which the actuation of the outputs for withdrawing power is obtained by clutch groups.

The aim of power take-offs, both intermediate and flywheel, is to allow a withdrawal of power which is then exploited in specific appropriate uses, such as moving pumps, fans, blowers or similar components included in the industrial vehicle depending on its scope of application.

The main need of power take-offs is thus to withdraw large quantities of power, while minimising their dimension, a typical factor in the automotive sector.

Currently this need is resolved by proposing solutions for clutch groups presenting a hydraulic drive.

However, such known clutch group solutions have a plurality of issues or restrictions related to the presence of oil, which make them particularly complex.

Firstly, because oil, unlike the air, is basically incompressible, such known clutch groups have means, valves and/or pump groups for the purpose of achieving a predetermined command modularity.

Secondly, oil has a much higher specific gravity and therefore, when the clutch is rotating, on account of the centrifugal force is difficult to expel from the command chamber of known clutch groups. These therefore provide, in order to ensure proper expulsion of the oil, return springs acting on the oversized clutch discs or use dual effect hydraulic commands.

SUMMARY OF THE INVENTION

The objective of the present invention is to make a clutch group suitable for the transmission of high torques, in which the above problems typical of the solutions of the prior art are overcome.

BRIEF DESCRIPTION OF THE DRAWINGS

The characteristics and advantages of the clutch group according to the present invention will be evident from the description given below, by way of a non-limiting example, according to the appended drawings, wherein.

DETAILED DESCRIPTION OF THE DRAWINGS

Figure 1:
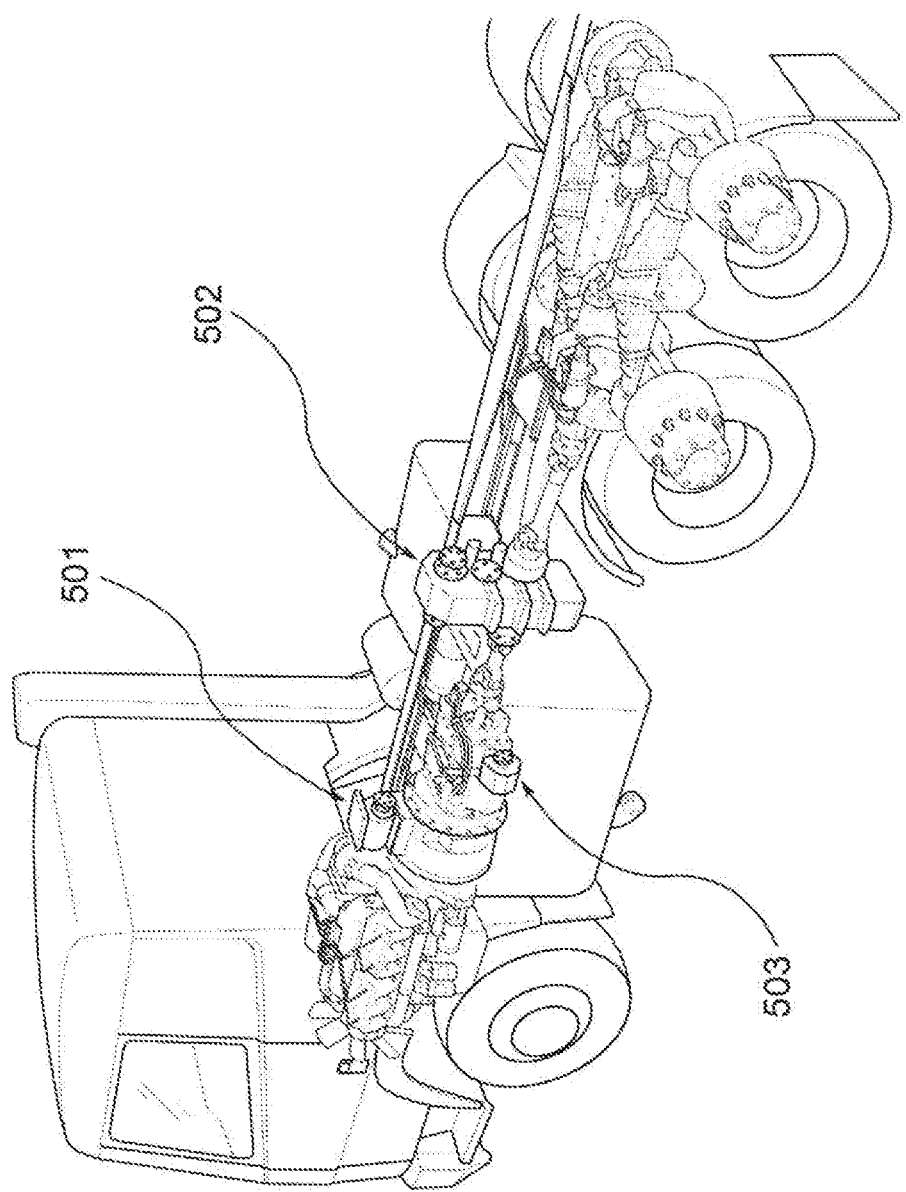
FIG. 1 shows a perspective view of an industrial vehicle with some components in transparency, in which an intermediate power take-off, a power take-off on the gearbox, and a power take-off at the flywheel comprising a clutch group according to the present invention are visible.
Figure 2:
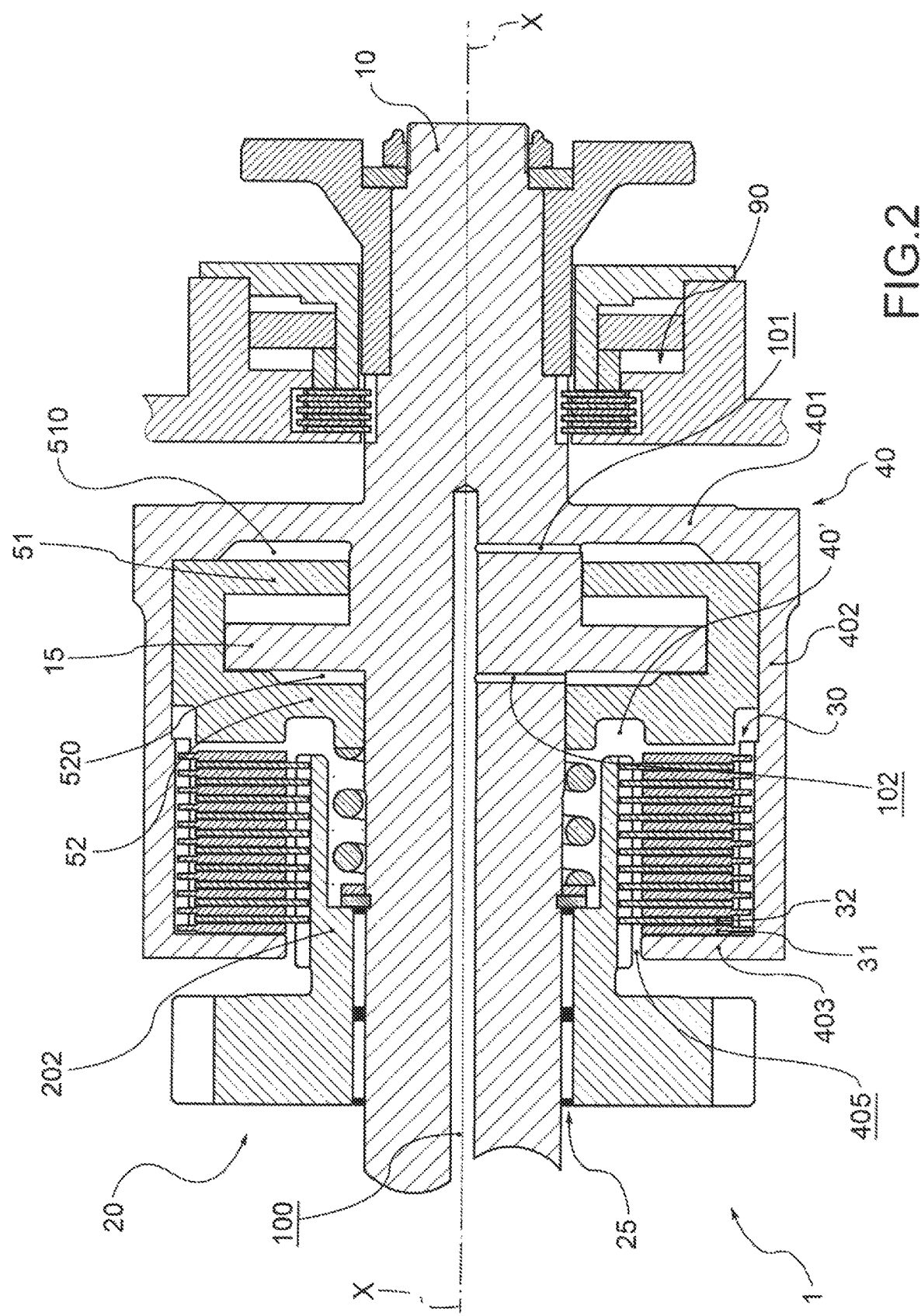
FIG. 2 shows a simplified cross-section view of a clutch group of the present invention, according to a preferred embodiment.

With reference to the appended drawings, reference numeral 1 globally denotes a clutch group in its entirety according to a preferred embodiment.

Preferably, the clutch group 1 is part of a power take-off for industrial vehicles also object of the present invention.

In other words, the clutch group 1 is suitable for connecting operatively two components in such a way as to transmit torque from the first to the second.

In a preferred embodiment said power take-off comprising the clutch group 1 is a flywheel power take-off 501 and is suitable to be placed between the engine group and the gearbox speed change unit of the industrial vehicle.

In one embodiment variation, said power take-off comprising the clutch group 1 is an intermediate power take-off 502 suitable to be interposed between the output of the speed-change gearbox unit and rear axle of the industrial vehicle and is mounted suspended from its chassis.

In a further embodiment variation, said power take-off comprising the clutch group 1 is a gearbox power take-off 503 and is therefore suitable to be coupled to the gearbox of the speed-change unit of the industrial vehicle through a specially shaped window.

Figure 3:
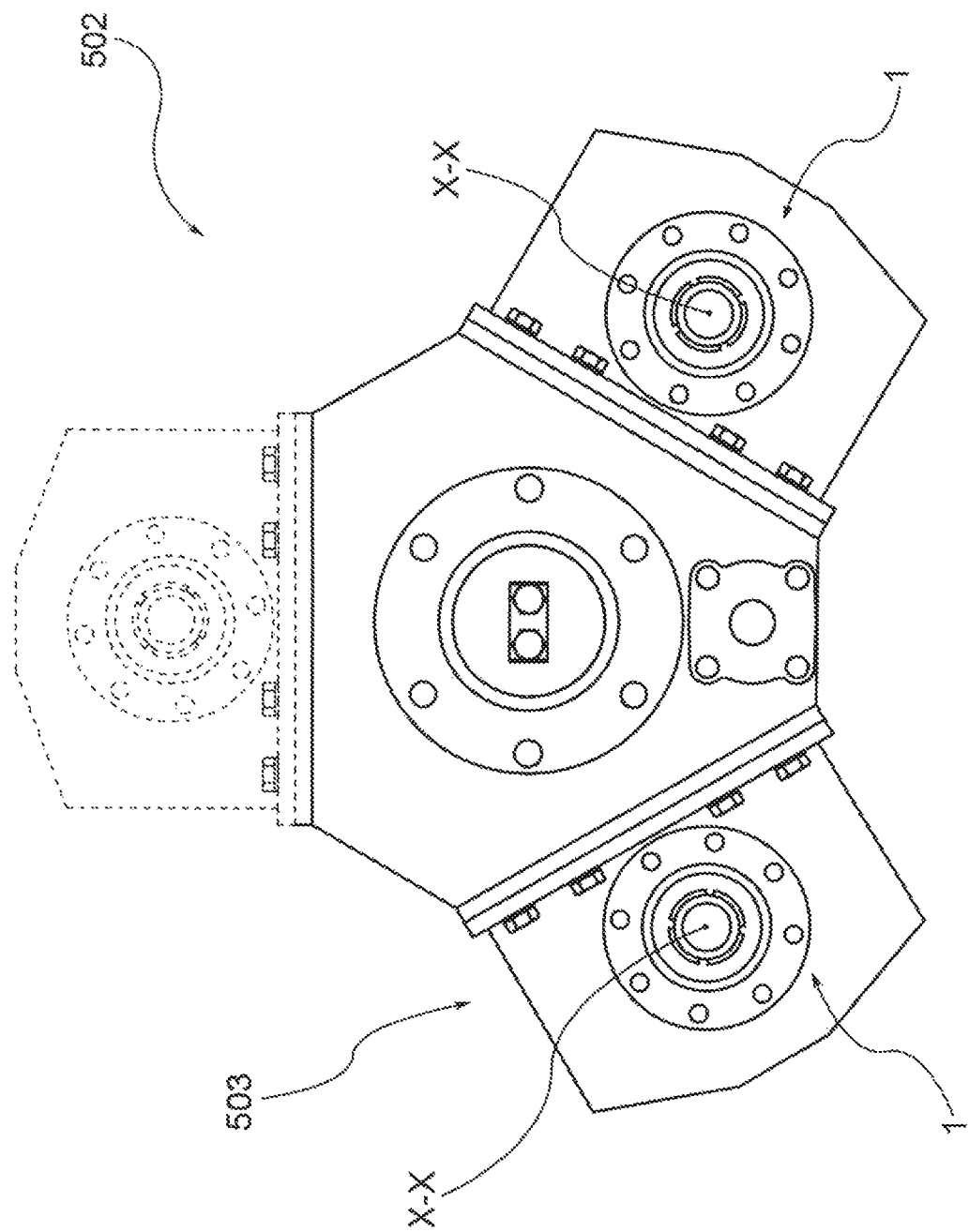
FIG. 3 shows a schematic front view of an intermediate power take-off consisting of a central module and a plurality of gearbox power take-offs integrating the lateral clutch group, according to a preferred embodiment.
Figure 4:
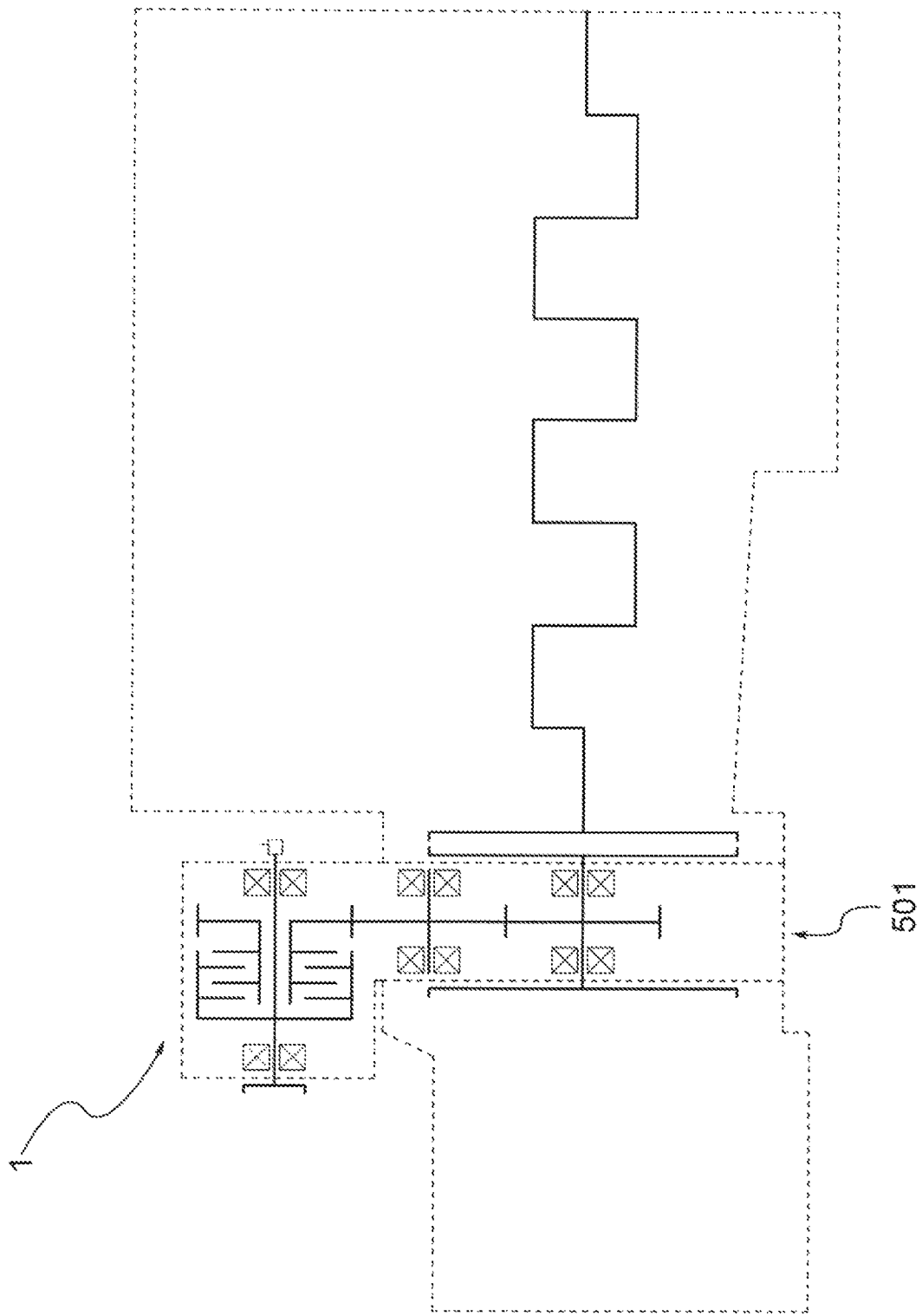
FIG. 4 schematically illustrates a flywheel power take-off, comprising the clutch group shown in FIG. 1, placed between a diesel engine and a gearbox speed change unit of an industrial vehicle.
Figure 5:
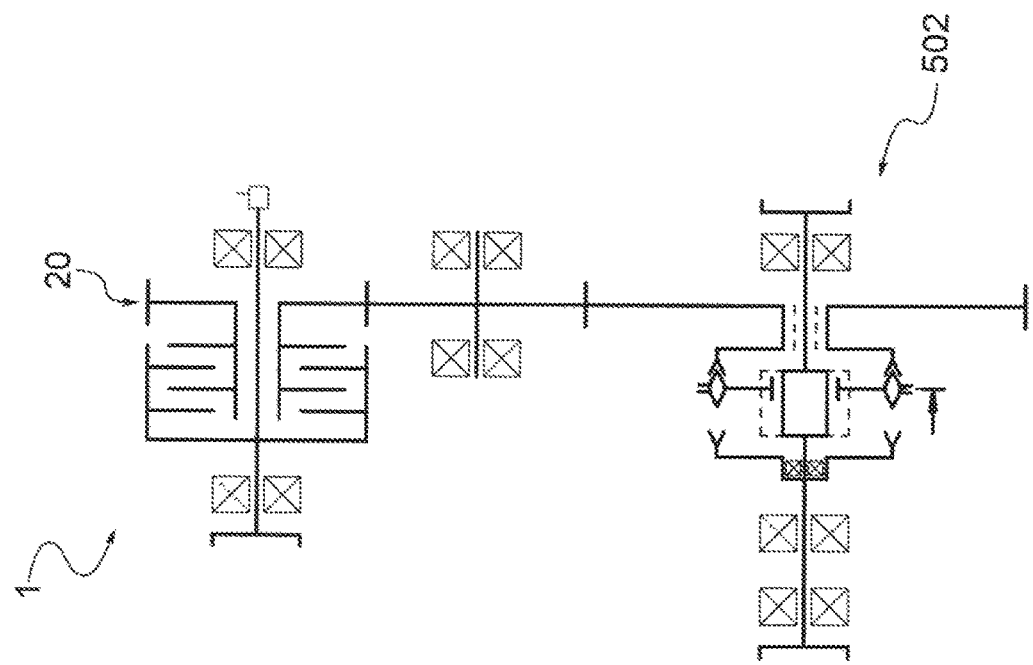
FIGS. 5 and 5' schematically represent a vertical intermediate power take-off with integrated clutch group, respectively with the power take-off in the disabled configuration, i.e. in a driving condition, and in the enabled configuration.
Figure 5:
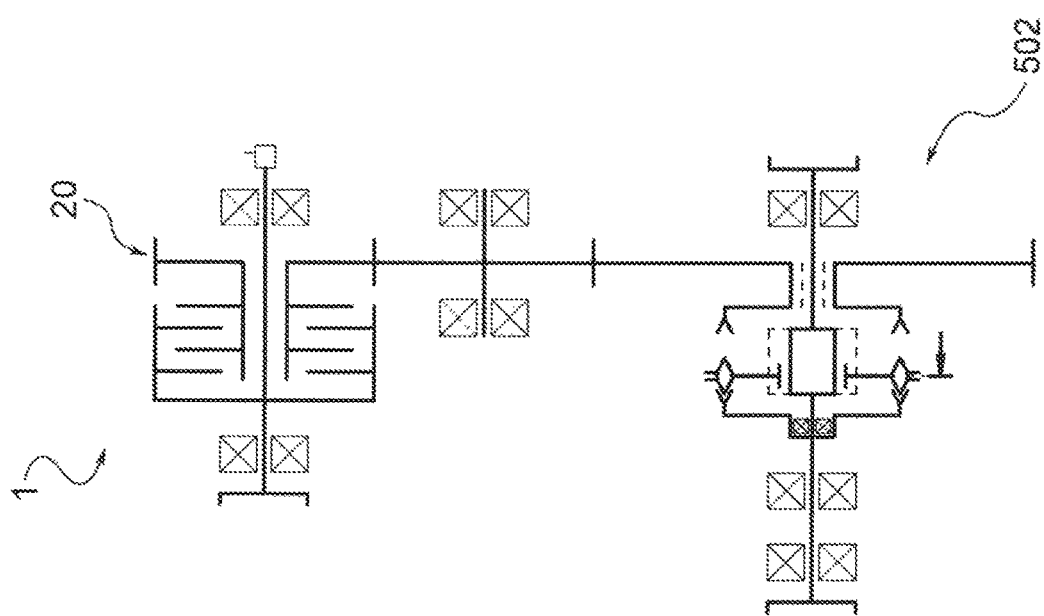
Figure 6:
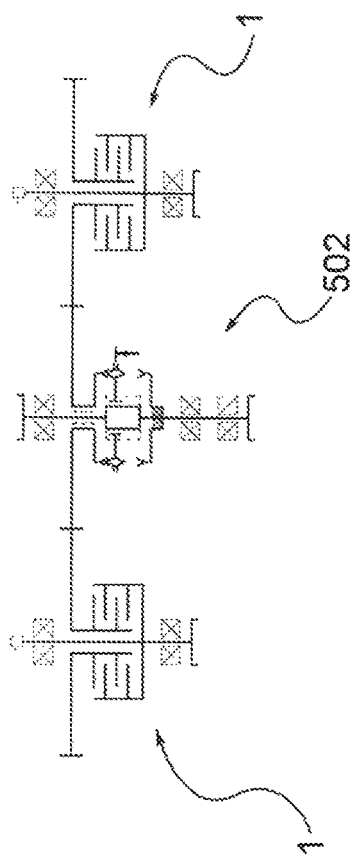
FIGS. 6 and 6' schematically illustrate a horizontal intermediate power take-off comprising two integrated clutch groups (one for each lateral shaft), respectively with the power take-off in the disabled configuration, i.e. in a driving condition, and in the enabled configuration.
Figure 7:
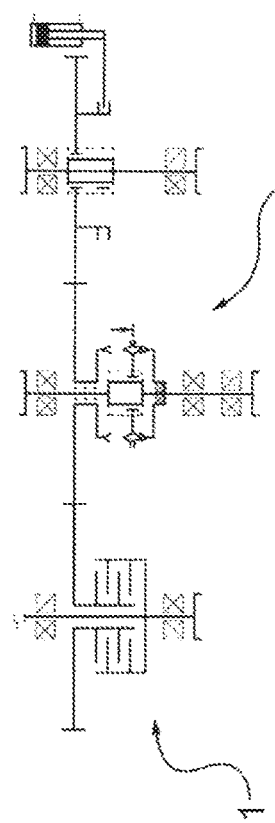
FIGS. 7 and 7' schematically illustrate a horizontal intermediate power take-off comprising an integrated clutch group (operatively connected with one of the two lateral shafts) and a sliding gear to engage-disengage the other lateral shaft with no clutch respectively with said sliding gear disengaged and in the engaged position.
Figure 6:
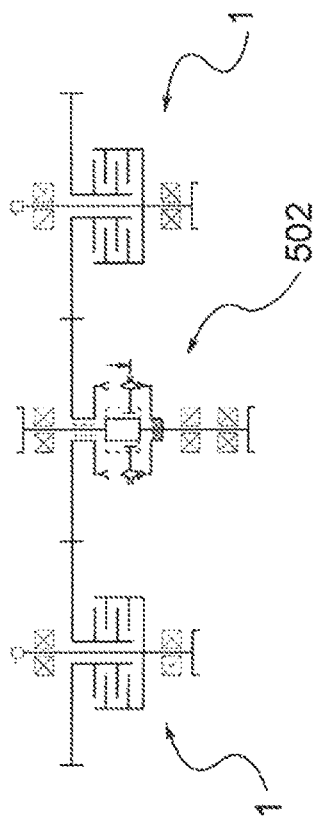
Figure 7:
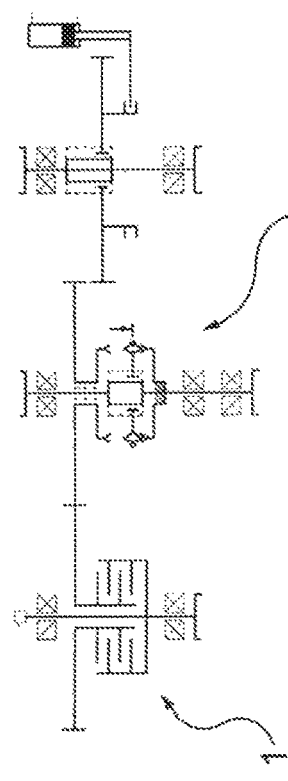
Figure 8:
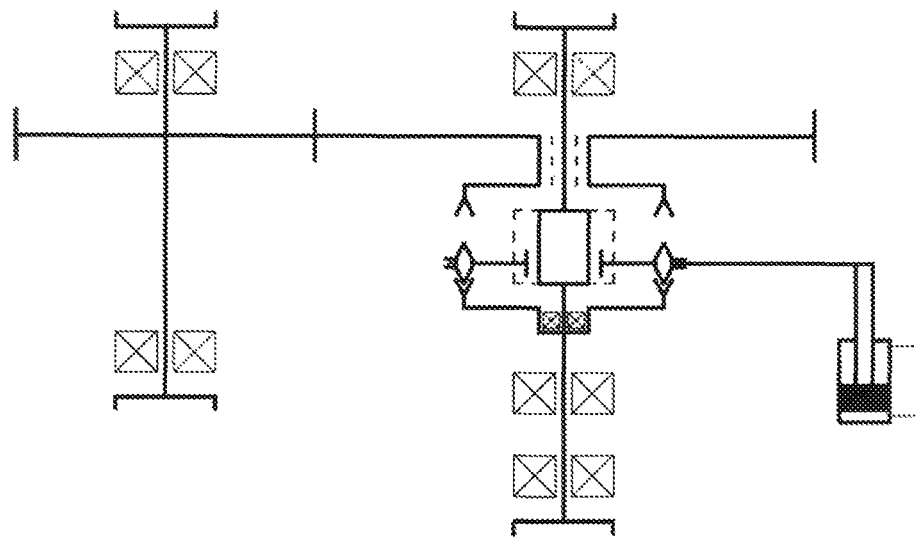
FIGS. 8 and 8' schematically illustrate an auxiliary shaft for moving small hydraulic pumps, which can be fitted on the horizontal intermediate power take-offs, such as those in FIGS. 6, 6',7, and 7' respectively in the disabled configuration i.e. in a driving condition, with the auxiliary shaft not-rotating and an enabled configuration, with the auxiliary shaft in rotation from the entrance.
Figure 8:
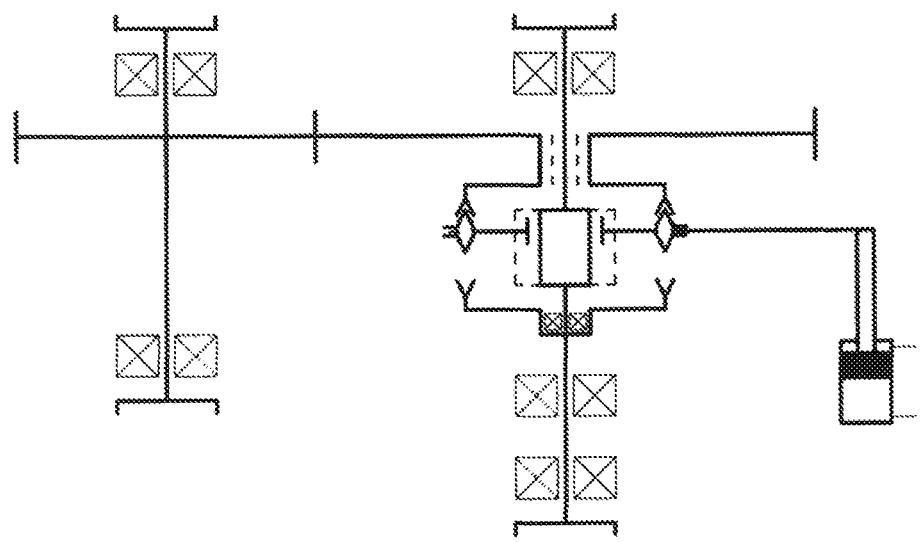
Figure 9:
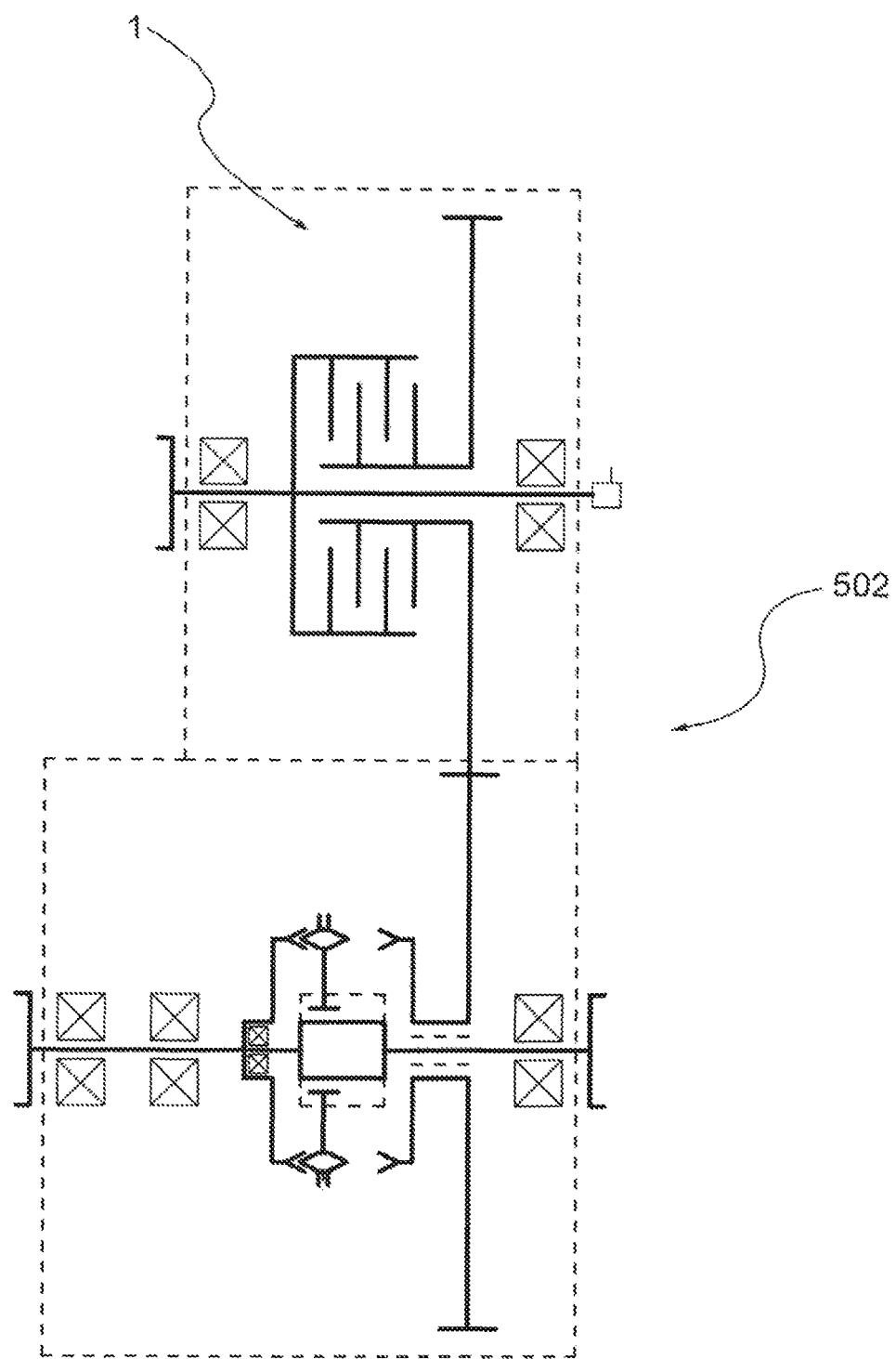
FIG. 9 illustrates a vertical intermediate power take-off with integrated clutch having two axes.

In yet a further embodiment variation, said power take-off comprising the clutch group 1 is an intermediate power take-off 502 and is suitable to be interposed between the output of the speed-change gearbox unit and rear axle, comprising a central module and at least one gearbox power take-off 503, as shown, in a non-limiting manner, in FIG. 3.

The clutch group of the present invention comprises a clutch shaft 10 extending along an axis X-X, suitable to be operated in rotation around said axis X-X.

Moreover, the clutch group 1 comprises an input gear 20 operatively connected to control the clutch shaft 10, so as to control its rotation when mutually connected together.

Preferably, the input gear 20 is fitted on the clutch shaft 10. Preferably, the input gear 20 is fitted on the clutch shaft 10 by means of bearings 25 for example roller bearings.

Preferably, the input gear 20 comprises a shaft portion 202 having an axial extension along the axis X-X.

The clutch group 1 further comprises a plurality of clutch discs 30 comprising at least one clutch disc 31 and at least one gear disc 32 connected respectively to M the clutch shaft 10 and to the input gear 20 adapted to engage each other by means of friction.

Preferably, the plurality of clutch discs 30 consists in a packet of discs, for example ten pairs, which extend around and along the axis X-X.

Preferably, the clutch group 1 comprises a bell 40 supported by the clutch shaft 10 around it and suitable to house said plurality of clutch discs 30.

In other words, said bell 40 is integrally connected to the clutch shaft 10 for example by a support wall 401 extending radially with respect to the axis X-X. Moreover, the bell 40 comprises a housing wall 402 which extends from the support wall 401, parallel to the axis X-X, so as to define a bell housing area 40'. On the opposite side of the support wall 401, the bell 40 comprises a radial closing wall 403 and has a wall opening 405 near the clutch shaft 10 through which the shaft portion 202 of the input gear 20 is through housed.

According to a preferred embodiment, the clutch discs 30 are suitable to engage each other along the axis X-X so that, through the friction force, the rotation of the input gear 20 is transmitted to the bell 40, and then to the clutch shaft 10.

According to a preferred embodiment, the clutch disc or each clutch disc 31 is keyed to the bell 40, preferably to the housing wall 402 so as to move in rotation the clutch shaft 10 by means of the bell 40.

Preferably, the clutch disc 31 is made by sintering; in other words, preferably, the clutch disc 31 comprises a core in a material chosen from steel alloys coated with sintered friction material.

According to a preferred embodiment, the gear disc 32 or each gear disc 32 is keyed to the gear 20, preferably to the shaft portion 202, so as to be moved in rotation by the rotation of the gear 20.

Preferably, the gear disc 32 is in a material chosen from steel alloys.

According to a preferred embodiment, the clutch group 1 further comprises disc lubrication means (not shown) for the forced lubrication of the plurality of clutch discs 30. The disc lubrication means are suitable to bring a predetermined quantity of lubrication oil to the clutch discs 30 to keep them lubricated and cooled. In further preferred embodiments, the clutch discs 30 are lubricated with an oil bath solution.

According to a preferred embodiment, the clutch group 1 further comprises pneumatic control means 50 operable by means of a pressurised fluid suitable to engage the clutch discs 30 and result in their mutual engagement.

Preferably, the pneumatic control means 50 are housed in the bell 40; preferably, between the clutch discs 30 and the support wall 401.

Preferably, the pneumatic control means 50 extend around the axis X-X.

According to a preferred embodiment, the pneumatic control means 50 comprise a main piston 51 housed in a main thrust chamber 510 and an auxiliary piston 52 housed in an auxiliary thrust chamber 520.

Preferably, inside the respective thrust chamber, the two pistons are suitable to be controlled in movement along the axis X-X to control the mutual engagement between the plurality of clutch discs 30.

According to a preferred embodiment, the main piston 51 and the secondary piston 52 are positioned in series along the axis X-X. In other words, inside the bell 40 the main thrust chamber 510 and the auxiliary thrust chamber 520 are made in series along the axis X-X, so that the two pistons are moved along said axis X-X. In yet other words, the clutch group 1 according to the present invention comprises a double thrust chamber.

According to a preferred embodiment, the main piston 51 and the secondary piston 52 are solidly joined to each other. In other words, the two pistons are suitable to operate simultaneously along the axis X-X, upon the action of the pressurised fluid.

Preferably, the main thrust chamber 510 and the auxiliary thrust chamber 520 are separated by a separation wall 15 integrally connected to the clutch shaft 10. In other words, the main thrust chamber 510 and the auxiliary thrust chamber 520 are made close to the clutch shaft 10 mutually separated from each other by a separation wall 15, preferably in the form of a ring or disc, fitted on the clutch shaft 10.

According to a preferred embodiment, inside the clutch shaft 10 the clutch group 1 comprises a feed system specifically suited to feed pressurised fluid to the main thrust chamber 510 and the auxiliary thrust chamber 520. Preferably, the two chambers are fed simultaneously or separately from each other.

According to a preferred embodiment, the feed system has at least one fluid feed channel 100, extending along the axis X-X.

Preferably, moreover, the feed system has two transverse feed ducts 101, 102 respectively suitable to place in fluidic connection the main thrust chamber 510 and the auxiliary thrust chamber 520 with at least one fluid feed channel 100. For example in some embodiments each transverse feed duct 101, 102 is served by a respective feed channel 100.

In a preferred embodiment, the clutch shaft 10 has a fluid feed channel 100 along the axis X-X connected to the two transverse feed ducts 101, 102 which extend radially from it.

Preferably, the fluid feed channel 100 extends at the centre of the clutch shaft 10 along the axis X-X and the two transverse feed ducts 101, 102 extend perpendicularly to it.

According to a preferred embodiment therefore, both thrust chambers are served through a single channel. Preferably, the same pressurised fluid is suitable to act on both pistons.

According to a preferred embodiment, the clutch group 1 further comprises a multiple-plate brake 90 mounted on the axis X-X.

Preferably, the multiple-plate brake 90 is placed on the opposite side to the input gear 20. Preferably, the multiple-plate brake 90 is suitable to act on the clutch group 1 in a configuration in which pressurised fluid is not introduced into the thrust chambers, i.e. when the mutual engagement action between the clutch discs 30 is not implemented by the pneumatic means 50. Preferably, therefore, the multiple-plate brake 90 is suitable to block any rotation of the clutch shaft 10 for example due to drag forces between the clutch discs 30.

Innovatively, the clutch group according to the present invention makes it possible to achieve the declared purpose of the invention, i.e. to overcome the problems and limitations typical of the prior art ensuring the transmission of high torques.

Advantageously, the clutch group has reduced overall dimensions. Advantageously, in fact, the clutch group according to the present invention is suitable to transmit high power levels while maintaining reduced diameters. In other words, advantageously, as compared to a known pneumatic clutch group, for the same pressure, the clutch group according to the present invention multiplies the thrust on the clutch discs thanks to the presence of the double thrust chamber.

Advantageously, as compared to a known pneumatic clutch group, for the same thrust output on the clutch discs, the clutch group according to the present invention has a smaller diameter or is usable with lower pressures.

Again advantageously, compared to a known pneumatic clutch group, for the same diameter, the clutch group according to the present invention has a greater thrust output on the clutch discs.

In addition, advantageously, the clutch group is suitable to be comprised in flywheel power take-offs, intermediate power take-offs or gearbox power take-offs. Advantageously, the clutch group is suitable to be comprised in intermediate power take-off's having the characteristics described in the patents on behalf of the Applicant IT1277770 and IT1314722. Again, advantageously, the clutch group is suitable to be integrated in power take-offs where the clutch is applied laterally, such as intermediate power take-off's comprising a central module and a gearbox power take-off applied laterally thereto. In other words, the clutch group is advantageously applicable to power take-offs suitable to operate both with the industrial vehicle at a standstill and with a moving industrial vehicle.

Advantageously, the clutch group according to the present invention has pneumatic control means, fed by a fluid feed system, suitable to ensure an easy to manage elevated thrust, for example, not requiring any special control valves as instead happens in the prior solutions in which the control of the clutch group is hydraulic.

An additional advantageous aspect lies in the fact that the control pressure for operating the pneumatic means (typically between 6 and 10 bar) is always available on industrial vehicles since used to unlock and activate the braking system thereof and therefore no special components on the vehicle are required to operate the clutch group.

Advantageously, the clutch group is suitable to handle any dragging phenomena between the clutch discs by applying the multiple-plate brake.

In addition, advantageously, the multiple-plate brake is suitable to be included as an integral part of the clutch group or is suitable to be supplied as a module applicable to the clutch group.

Advantageously, the multiple-plate brake has specific and fundamental application as the number of clutch discs increases, increasing the drag forces with the number of clutch discs.

It is clear that a person skilled in the art may make modifications to the clutch group and power take-offs comprising it so as to satisfy contingent requirements, all contained within the scope of protection as defined by the following claims.

The invention claimed is:

1. A clutch group for power take-off for industrial vehicles comprising:
   a clutch shaft extending along an axis;
   an input gear operatively connected to the clutch shaft;
   a plurality of clutch discs comprising at least one clutch disc and at least one gear disc connected respectively to the clutch shaft and to the input gear adapted to engage each other by friction;
   a bell supported by the clutch shaft around the bell and suitable to house said plurality of clutch discs;
   a pneumatic controller operable by pressurised fluid and housed in the bell disposed around the axis comprising:
   i) a main piston housed in a main thrust chamber;
   ii) an auxiliary piston housed in an auxiliary thrust chamber;
   wherein the main piston and the auxiliary piston are controllable in movement along the axis to control mutual engagement between the plurality of clutch discs.

2. Clutch group according to claim 1, wherein the main piston and the auxiliary piston are positioned in series along the axis.

3. Clutch group according to claim 1, wherein the main piston and the auxiliary piston are integrally joined to each other.

4. Clutch group according to claim 1, wherein the main thrust chamber and the auxiliary thrust chamber are separated by a separation wall integrally connected to the clutch shaft.

5. Clutch group according to claim 1, comprising a feed system inside the clutch shaft for feeding the pressurised fluid of the main thrust chamber and the auxiliary thrust chamber.

6. Clutch group according to claim 5, wherein the feed system has at least one fluid feed channel extending along the axis and has two transverse feed ducts respectively suitable for putting the main thrust chamber and the auxiliary thrust chamber in fluid communication with the at least one fluid feed channel.

7. Clutch group according to claim 6, wherein the clutch shaft has the at least one fluid feed channel extending along the axis connected to the two transverse feed ducts that extend radially from the fluid feed channel.

8. Clutch group according to claim 1, wherein the clutch disc is keyed to the bell and comprises a core of a material selected from among steel alloys coated with a sintered friction material.

9. Clutch group according to claim 1, wherein the gear disc is keyed to the gear and is made of a material selected from among steel alloys.

10. Clutch group according to claim 1, further comprising a disc lubricator for forced lubrication of the plurality of clutch discs.

11. Clutch group according to claim 10, further comprising a multiple-plate brake mounted on the axis.

12. Flywheel power take-off suitable to be interposed between an engine unit and speed-change gearbox unit of the industrial vehicle comprising the clutch group according to claim 1.

13. Intermediate power take-off suitable to be interposed between an output of a speed-change gearbox unit and rear axle of the industrial vehicle mounted suspended from a chassis of the industrial vehicle comprising the clutch group according to claim 1.

14. Gearbox power take-off couplable to a case of a speed-change gearbox unit of the industrial vehicle comprising the clutch group according to claim 1.

15. Intermediate power take-off suitable to be interposed between the output of a speed-change gearbox unit and the rear axle of the industrial vehicle, comprising a central module and at least one gearbox power take-off according to claim 13.

* * * * *